(12) United States Patent  (10) Patent No.: US 7,209,177 B2
Lapalme et al.  (45) Date of Patent: Apr. 24, 2007

(54) HEADSET FOR CAMERA

(75) Inventors: Marie Lapalme, Boucherville (CA); Luc Ducas, Boucherville (CA); Michel Dallaire, Montreal (CA); Patrick Messier, Montreal-East (CA)

(73) Assignee: Audisoft, Longueuil, Quebec (CA)

( * ) Notice: Subject to any disclaimer, the term of this patent is extended or adjusted under 35 U.S.C. 154(b) by 856 days.

(21) Appl. No.: 10/232,373

(22) Filed: Sep. 3, 2002

(65) Prior Publication Data

US 2004/0041929 A1   Mar. 4, 2004

(51) Int. Cl.
*H04N 5/225* (2006.01)
(52) U.S. Cl. ...................................... 348/375
(58) Field of Classification Search ......... 348/373–375
See application file for complete search history.

(56) References Cited

U.S. PATENT DOCUMENTS

| 3,174,517 | A |   | 3/1965  | Wilson |
| 4,139,743 | A |   | 2/1979  | Flygstad |
| 4,486,630 | A |   | 12/1984 | Fetchko |
| 4,588,868 | A |   | 5/1986  | Bertagna et al. |
| 4,620,068 | A |   | 10/1986 | Wieder |
| 4,953,766 | A |   | 9/1990  | Cruickshank |
| 5,146,619 | A |   | 9/1992  | Brown |
| 5,210,792 | A |   | 5/1993  | Kajihara |
| D346,026  | S |   | 4/1994  | Shubert et al. |
| 5,414,769 | A |   | 5/1995  | Gattey et al. |
| 5,446,788 | A |   | 8/1995  | Lucey et al. |
| D363,487  | S |   | 10/1995 | Thurnau |
| 5,533,122 | A |   | 7/1996  | Gattey et al. |
| 5,625,171 | A |   | 4/1997  | Marshall |
| 5,687,231 | A |   | 11/1997 | Gattey et al. |
| 5,712,453 | A |   | 1/1998  | Bungardt et al. |
| 5,721,775 | A |   | 2/1998  | Leifer |
| 5,761,298 | A |   | 6/1998  | Davis et al. |
| 5,793,865 | A |   | 8/1998  | Leifer |
| 5,828,749 | A |   | 10/1998 | Brodskiy |
| D404,734  | S |   | 1/1999  | Andrea |
| 5,870,166 | A |   | 2/1999  | Nowak et al. |
| 5,933,479 | A | * | 8/1999  | Michael et al. ........ 379/110.01 |
| D420,010  | S |   | 2/2000  | Pitel |
| D421,755  | S |   | 3/2000  | Pitel |
| 6,075,857 | A |   | 6/2000  | Doss, Jr. et al. |
| 6,097,809 | A |   | 8/2000  | Lucey et al. |
| 6,154,539 | A |   | 11/2000 | Pitel |
| 6,178,251 | B1 |  | 1/2001  | Luchs et al. |
| 6,212,020 | B1 |  | 4/2001  | Ahlgren et al. |

(Continued)

FOREIGN PATENT DOCUMENTS

EP   1 003 349   5/2000

(Continued)

*Primary Examiner*—Tuan Ho
(74) *Attorney, Agent, or Firm*—Ogilvy Renault LLP

(57) ABSTRACT

A head set is disclosed comprising a head band having a first and a second end; a pad-like support means attached to said first end of said head band to rest on a first side of a head; a mounting to support a camera; and an earpiece attached to said second end of said head band comprising: an ear-shaped, resilient wire formed so as to leave an anterior notch of an ear unobstructed; and an elastomeric covering that can pivot with respect to the wire having a broader flattened surface on one side to rest on a second side of said head.

14 Claims, 10 Drawing Sheets

U.S. PATENT DOCUMENTS

| | | |
|---|---|---|
| D443,870 S | 6/2001 | Carpenter |
| 6,301,050 B1 | 10/2001 | DeLeon |
| 6,320,960 B1 | 11/2001 | Lathrop, III et al. |
| 6,347,126 B1 | 2/2002 | Nagayasu et al. |
| 6,543,899 B2 * | 4/2003 | Covannon et al. ............. 353/7 |
| 2001/0017926 A1 | 8/2001 | Vicamini |
| 2002/0009191 A1 | 1/2002 | Lucey et al. |
| 2002/0030871 A1 | 3/2002 | Anderson et al. |

FOREIGN PATENT DOCUMENTS

| | | | |
|---|---|---|---|
| GB | 221 949 | | 9/1924 |
| GB | 2380886 A | * | 4/2003 |
| WO | WO 98/56209 | | 12/1999 |
| WO | WO 00/55673 | | 9/2000 |

* cited by examiner

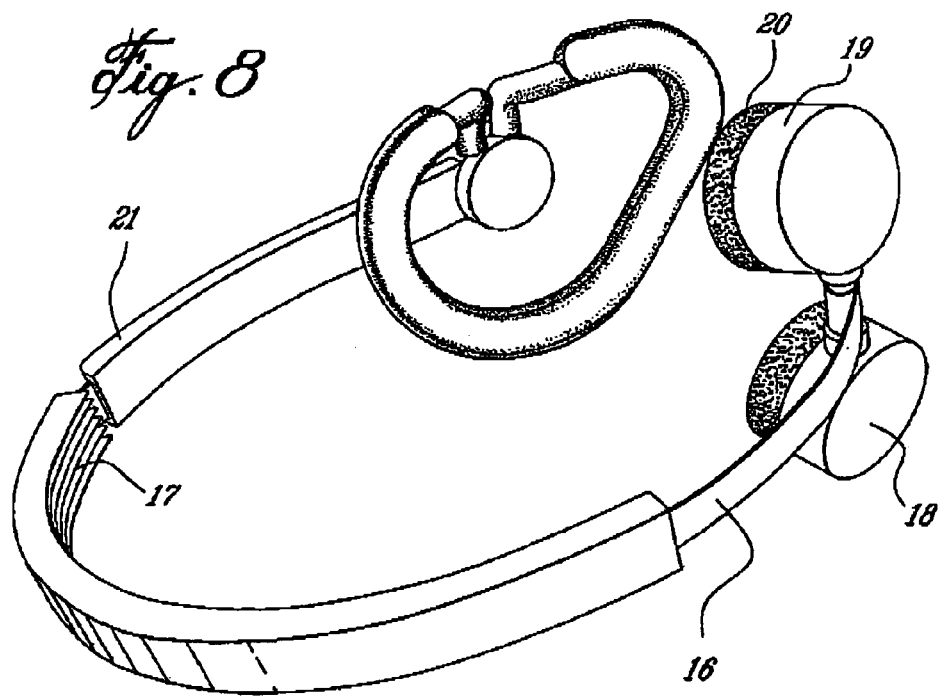
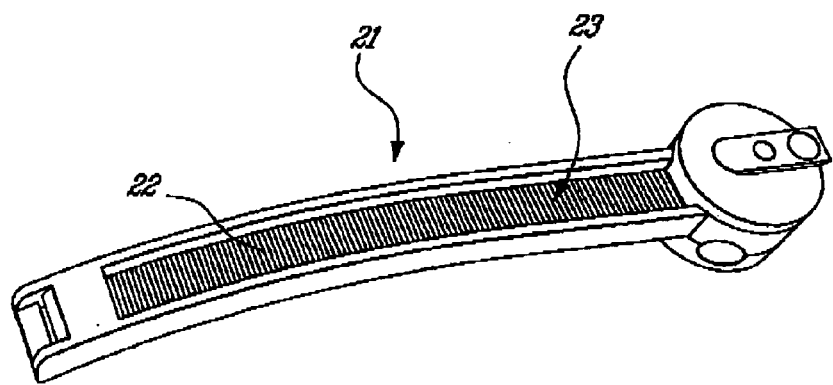

HEADSET FOR CAMERA

FIELD OF THE INVENTION

The invention relates to a headset. More specifically, it relates to an ergonomic and stable headset capable of supporting the weight of a camera without needing to compensate for head movement.

BACKGROUND OF THE INVENTION

Many different headsets exist in the art. Most are used for holding microphones and earphones for audio purposes. For example, many headsets exist to provide hand-free phones such as those for receptionists or simply for personal use. As the technology advances, these headsets are becoming smaller. Some of them have even been reduced to simply an earpiece that is placed around and inside the ear and functions as a transmitter and a receiver.

However, these headsets are not ideal to hold a piece of equipment, such as a camera, that weighs more than a microphone does. They do not provide the stability and the comfort necessary to have a stable camera mounted on a headset so that an image can be transmitted to a remote screen. Most of the camera mounted headsets that exist in the art require correction to be done to a captured image to compensate for the instability of the headset. Furthermore the headsets devised for this purpose are often bulky, heavy, and uncomfortable.

Camera mounted headsets are very useful tools in many fields. Remote support for technicians working out in the field is one example. An expert can be placed in an office and be able to view what the technician is viewing and instruct the technician on what the best course of action to take is. Technical support for home computer users is another example. Calling a hotline and asking an expert how to fix your computer when the expert has no visual aid of your system can often be frustrating. However if the user were provided with a camera mounted headset and could transmit images of his own view to a remotely located expert, this would facilitate the task of helping someone from a distance. The same can be said about mechanical support for a machine, whether it be in a home or for an industrial application in a factory.

Moreover, there is a need to provide a headset to which a camera can be mounted that is both stable and comfortable and can transmit images and voice signals.

SUMMARY OF THE INVENTION

Accordingly, an object of the present invention is to provide a headset that can be stable when mounted by heavy equipment such as a camera.

Another object of the present invention is to provide a headset that can support a camera and transmit images without needing to compensate for head motion or motion of the camera.

Yet another object of the present invention is to provide an earpiece for a headset that is flexible and comfortable and provides stability for the headset.

According to a first broad aspect of the present invention, there is provided a head set comprising: a head band having a first and a second end; a pad-like support means attached to the first end of the head band to rest on a first side of a head; a mounting to support a camera; and an earpiece attached to the second end of the head band that can pivot in at least two directions with respect to the headband, the earpiece comprising an ear-shaped, resilient wire; and an elastomeric covering that can pivot with respect to the wire.

Preferably, the elastomeric covering is in two pieces, a first which is a tube having an inner diameter larger than the diameter of the wire, and a second which is a support piece having a first side with a groove to fit over the tube and a second side which is broader and flatter. Also preferably, the earpiece is formed so as to leave the anterior notch of the ear unobstructed.

According to a second broad aspect of the present invention, there is provided a method for forming an earpiece for a headset comprising: bending a first portion of a resilient wire having a first and a second end around a cylindrical surface having a first diameter for forming a curved portion corresponding to an upper portion of an ear; bending a second portion of the resilient wire around a cylindrical surface having a second diameter for forming a curved portion corresponding to a lower portion of an ear; curving the first and second end of said wire so that the first and second end are parallel to each other and perpendicular to the rest of the earpiece; and covering the wire with an elastomeric material to provide for cushion contact against a person's head; wherein a space is left between the first and second end so as to leave an anterior notch of an ear unobstructed.

BRIEF DESCRIPTION OF THE DRAWINGS

These and other features, aspects and advantages of the present invention will become better understood with regard to the following description and accompanying drawings wherein:

FIG. 8 is the headset;

FIG. 9 is the adjustable portion of the head band;

DETAILED DESCRIPTION OF THE PREFERRED EMBODIMENT

Figure 1:
FIG. 1 is a resilient wire.
Figure 2:
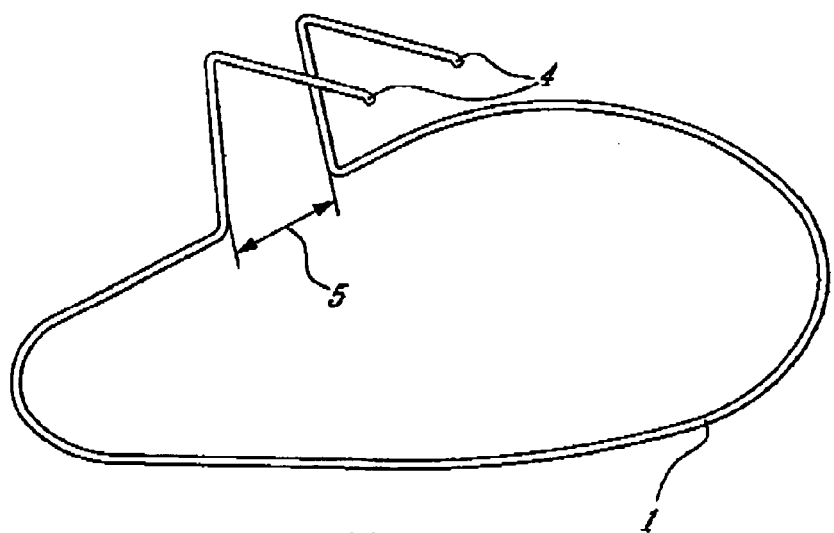
FIG. 2 is the resilient wire after it has been shaped.

FIG. 1 is a piece of piano wire 1, cut to a specific length. Both ends are bent outwards 2 and upwards 3, as is seen in the figure. In the preferred embodiment, this is done with the use of a vice. It can be appreciated that many methods are possible to form the two ends of the wire. The wire is a resilient spring wire that returns to its original shape unless it is properly formed using strong equipment. FIG. 2 is the piano wire after it has been shaped into the final format. The shape represents the shape of an ear with the anterior notch left 5 unobstructed. The actual size is meant to be larger than an actual ear so as to fit loosely around an ear and rest on the side of the head. The preferred embodiment uses a steel music wired of gauge 24 with a 0.055 inch diameter. The ear shape is formed with a special jig, to be described further. Alternatively, the ear shape can be formed using digital equipment in the same way that springs are formed.

Figure 3:
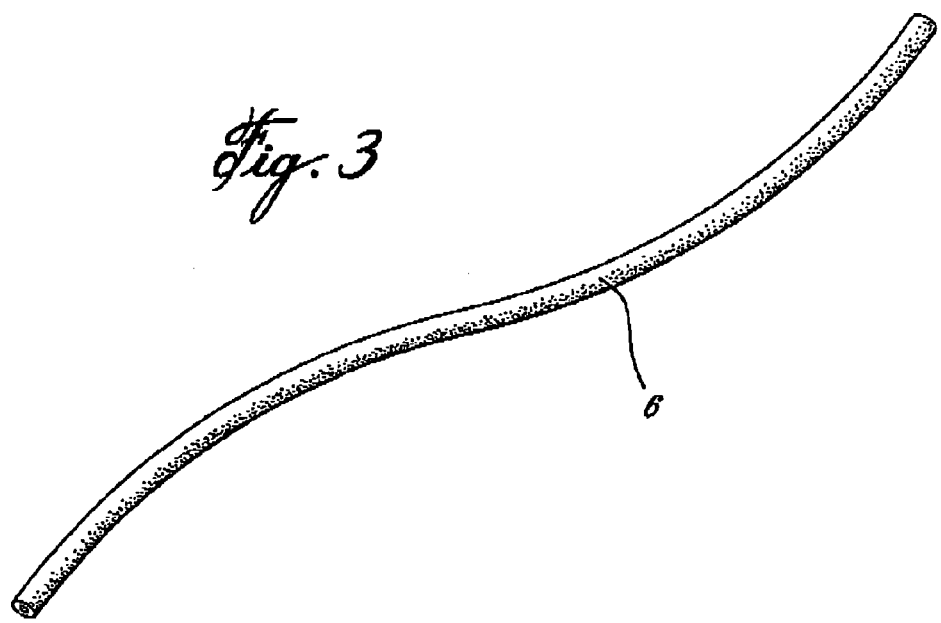
FIG. 3 is a rubber tube before it has been shaped.

FIG. 3 shows a tubular rubber 3 used to cover the piano wire 1. The tube is also cut a specific length so as to be proportional to the length of the piano wire. The preferred embodiment calls for extrusion TPR to be used as the material for the tube. The inner diameter of the tube must be larger than the diameter of the piano wire. The difference between the two diameters is not so large as to have the piano wire loose in the tube, but just enough to allow a pivot motion of the covering with respect to the wire. This provides the earpiece with a flexibility that makes it less rigid. The wire is inserted into the tubular rubber using a lubrifying agent. The lubricant, such as silicon, is injected into the center of the tubular rubber so as to facilitate the insertion of the wire within it.

Figure 4:
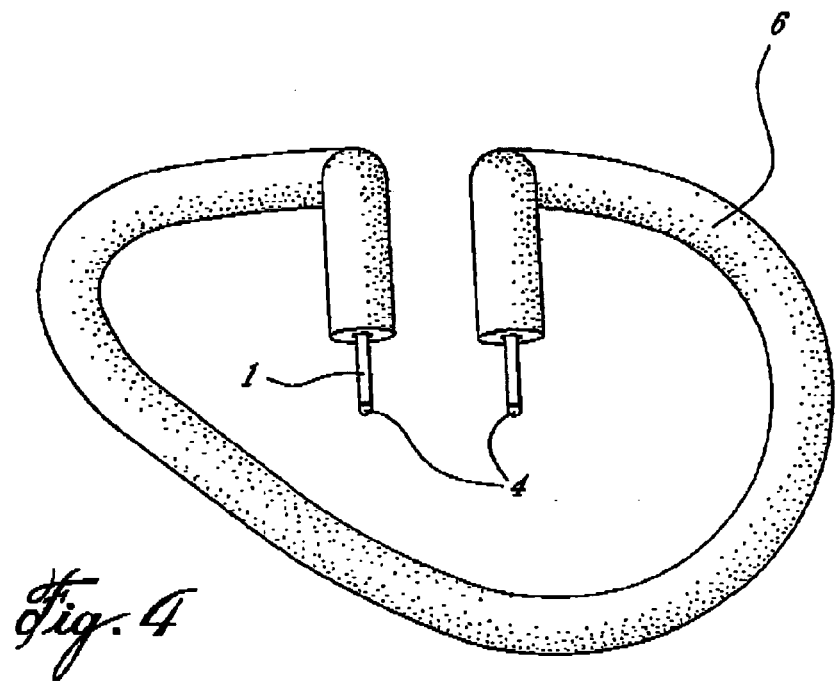
FIG. 4 is a rubber tube with the shaped piano wire inserted into it.
Figure 5:
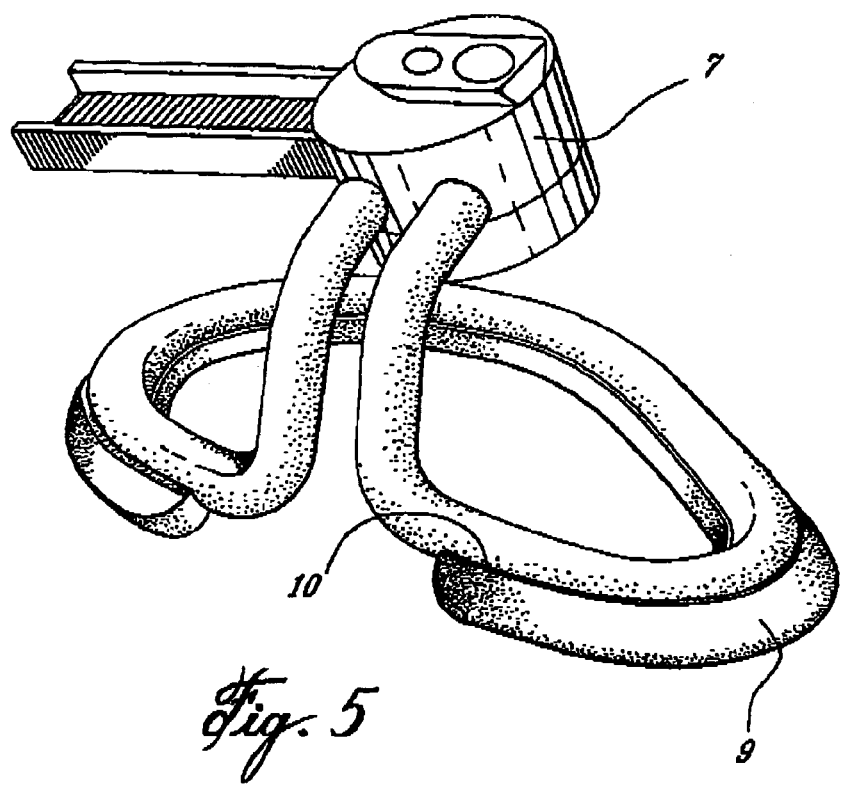
FIG. 5 is a the earpiece inserted into a connector for the headband.

FIG. 4 shows the piano wire 1 inside the tube 6. Each end of the piano wire protrudes from the tube by a length that allows the earpiece to be connected to a headband to form the headset. The ends are slightly bent 4 so as to fit into small grooves in a connecting piece (not shown) that secures the earpiece and prevents it from being pulled out. FIG. 5 shows the earpiece inserted into a connecting end 7 of the headband. This connector 7 offers a cylindrical pivot to the earpiece. The earpiece can be moved upwards and downwards with great flexibility. Pressure can also be applied to the area of the earpiece across from the spacing for the anterior notch, moving part of the earpiece towards the headband and having it return into place upon release. These added flexibilities are due to the springing nature of the wire, the spacing of the tube with respect to the wire, the material used for the tube, and the connection made to the headband. The earpiece is very flexible and can pivot about a multitude of axes, adding a level of comfort and adjustment not present without the added flexibility.

Figure 6:
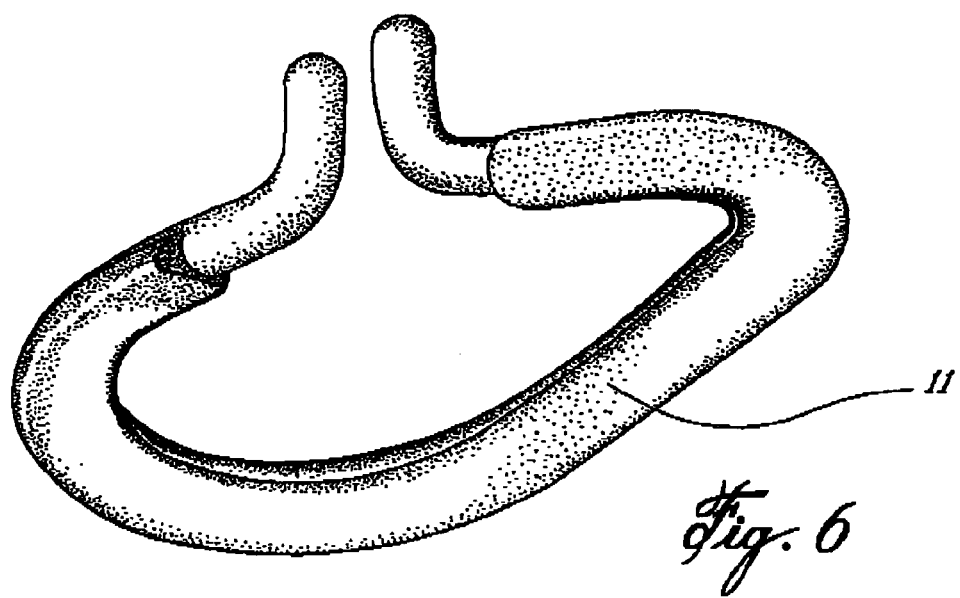
FIG. 6 is the earpiece with the non-rigid support.

In order to add some comfort to the user wearing the headset, a non-rigid support 9 is added to the earpiece. A thermal plastic rubber is molded into the shape of the earpiece and placed on top of the tube. One side of the support comprises a groove 10 to fit snugly around the tube, as can be seen in FIG. 5. The other side of the tube is a broader, flatter surface 11, as shown in FIG. 6. The broader surface 11 is the one that rests on the head when the headset is in place. Its shape and material serve to make the earpiece accommodate the different head surfaces that vary from person to person. The earpiece touches the head at a greater number of points along the support than it would if the support were not there and there was only the tube. It can be appreciated that the tube and support can be molded together and made to be only one piece made of an elastomeric material.

Figure 7:
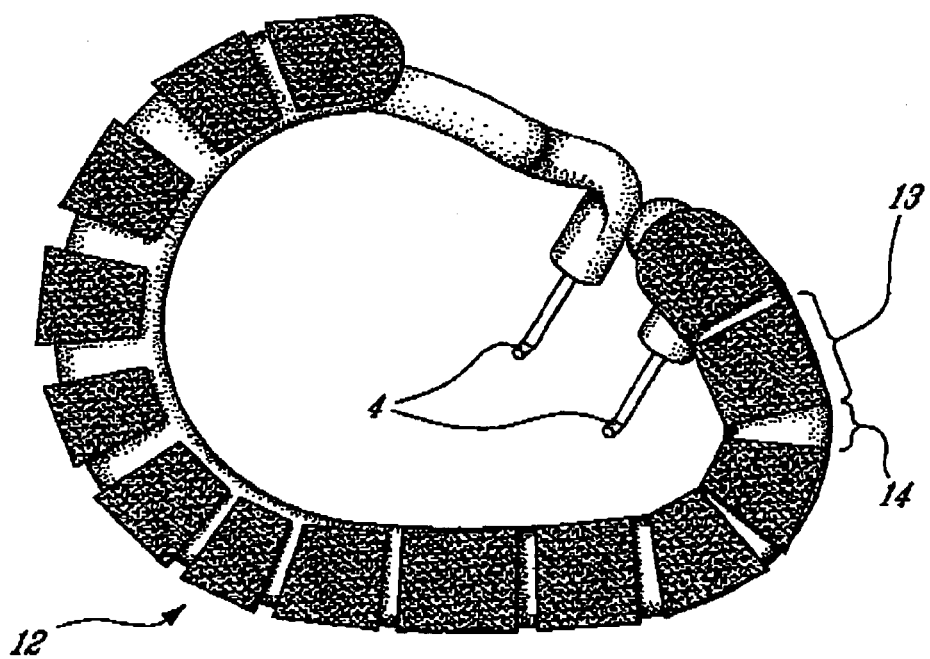
FIG. 7 is the cushion for accommodating glasses.
Figure 10A:
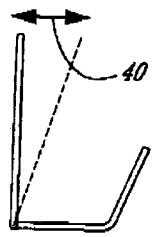
FIG. 10*a* is a top view of the earpiece.
Figure 10B:
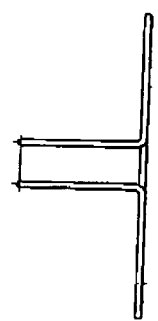
FIG. 10*b* is a side view of the earpiece.
Figure 10C:
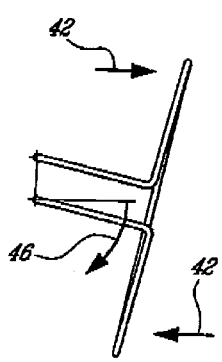
FIGS. 10*c* and 10*d* are side view of the earpiece.
Figure 10D:
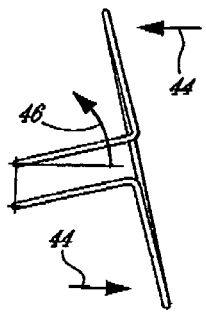
Figure 10E:
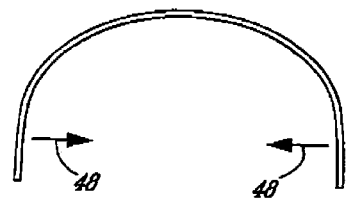
FIGS. 10*e* and 10*f* are front views of the headband.
Figure 10F:
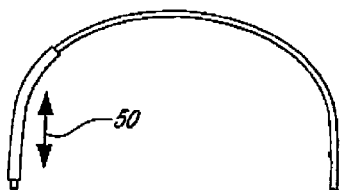

To further improve the comfort level of a wearer, a pad-like surface 12 can also be added to the earpiece. The pad-like surface 12, seen in FIG. 7, comprises a plurality of small cushions 13 separated by grooves 14. The grooves 14 allow the arm of a pair of glasses to slide through with ease. This avoids the discomfort felt by a person wearing glasses wherein the arm is squeezed against the head when the pad-like surface 12 is not present. Alternatively, an extra padding can be added without the grooves (not shown). A gel-like padding can provide extra comfort for a glasses-wearer. A foam padding can also be used.

The entire headset is shown in FIG. 8. The earpiece is connected to one end of a headband 16 as described above. The headband 16 can be made of plastic, metal, or any other typical material for headbands. The headband is inserted into a rubber piece 15 that is flat on one side and grooved 17 on the other side. The grooved side 17 is the part that resides on top of the head. This provides comfort to the wearer, whether he be bald or have a full head of hair. The grooved 17 side also prevents the headset from falling forward with the weight of the camera.

The second end of the headband 16 is connected to a pad-like support 18 that comprises two pivotable rounded surfaces having a hard side 19 and a cushion side 20. The cushion side 20 is the side that rests on the head above the ear and helps keep the headset stable while being comfortable to the user. It can be appreciated that the support for the second end of the headband can take many shapes and sizes, as long as the headset remains stable.

The headset is adjustable in length due to the plastic connector 21 to which one end of the headband and the earpiece are connected. FIG. 9 shows how the outer surface of the plastic connector comprises a grooved slot 22 wherein the end of the headband slides in and out and is set to a desired length. The small horizontal grooves 23 hold the end of the headband securely in place. The length can be adjusted manually by pulling on the connector portion and the headband portion in opposite directions.

Figures 11A, 11B, 11C:
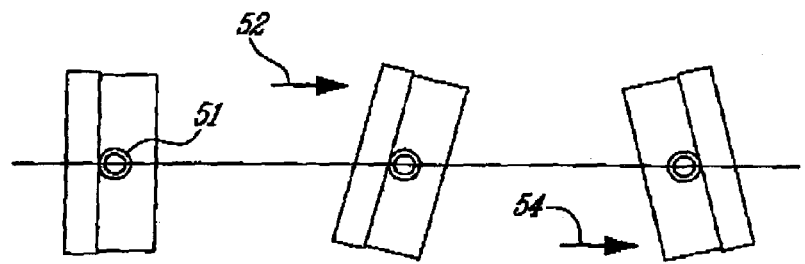
FIGS. 11*a*, 11*b*, and 11*c* are front view of the supporting pads.
Figures 11D, 11E, 11F:
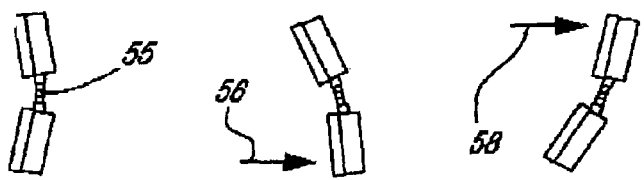
FIGS. 11*d*, 11*e*, and 11*f* are top views of the supporting pads.

FIGS. 10 and 11 illustrate the different ways in which the headset adjusts to the varying shapes and sizes, as well as the motions of the wearer. FIG. 10a is a top view of the earpiece. The arrow 40 shows how the earpiece can move away and towards the head. The springy nature of the wire insures contact with the head. FIG. 10b is a front view of the earpiece. Arrows 42 show the upwards rotational motion of the earpiece while arrows 44 show the downwards rotational motion of the earpiece. Arrows 46 show how the parts of the wire that are within the connector can pivot as well. FIG. 10c is a front view of the headband. Arrows 48 show that the headband applies tension on the head that keeps the headset in place. The tension varies with the size of the head of the wearer. FIG. 10d is also a front view of the headband and shows how the length of the headband can be adjusted (arrow 50).

FIG. 11a is a side view of the pad-like support means on the opposite end of the headband. The circular pads can pivot about a vertical axis, as shown by arrows 52 and 54. FIG. 11b is a top view of the two pads. Arrows 56 and 58 show how they can also pivot about a lateral axis.

Figure 12:
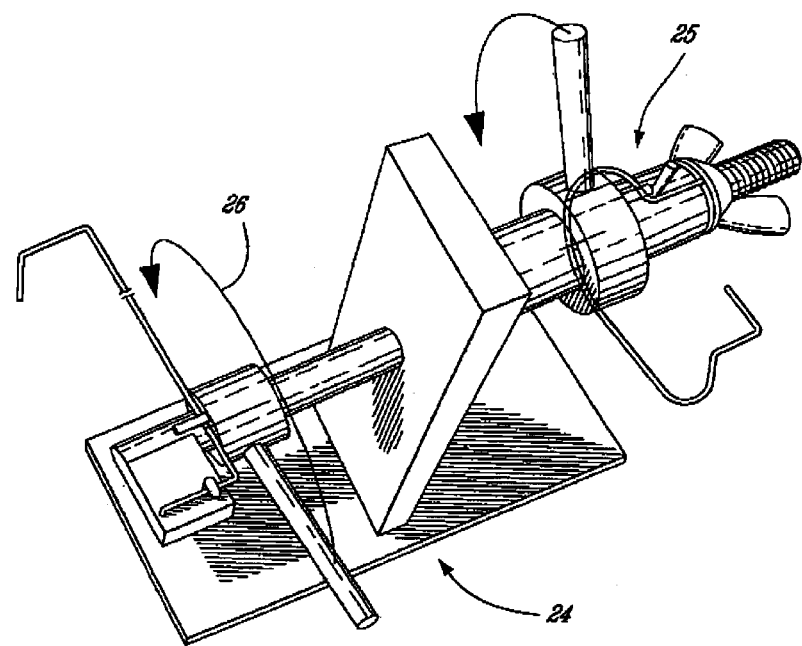
FIG. 12 is the jig used to form the wire into the earpiece shape.

FIG. 12 shows the jig 24 used to form the resilient piano wire 1 into the ear-shape. One side 25 is used to form the larger loop while the other side 26 is used to form the smaller loop. The wire is first shaped into the shape shown in FIG. 1. A first 90 degree angle is formed at a specific point, then a second 90 degree angle is formed, also from a specific point. This procedure is done for both ends of the wire. The last portion of a first end is placed into a hole 27 in a protruding end of one side of the jig. The protruding end is threaded and a bolt is screwed 28 into it to secure the wire in place. The diameter of the cylinder 29 around which the wire is to be turned is chosen so as to produce an ellipsoid shape of a desired size when the wire is released. The size of the cylinder is found through trial and error. The ellipsoid shape is due to the resilience of the wire. Even though the cylinder is circular, the wire naturally springs back slightly from its circular shape into the ellipsoid shape.

Figure 13:
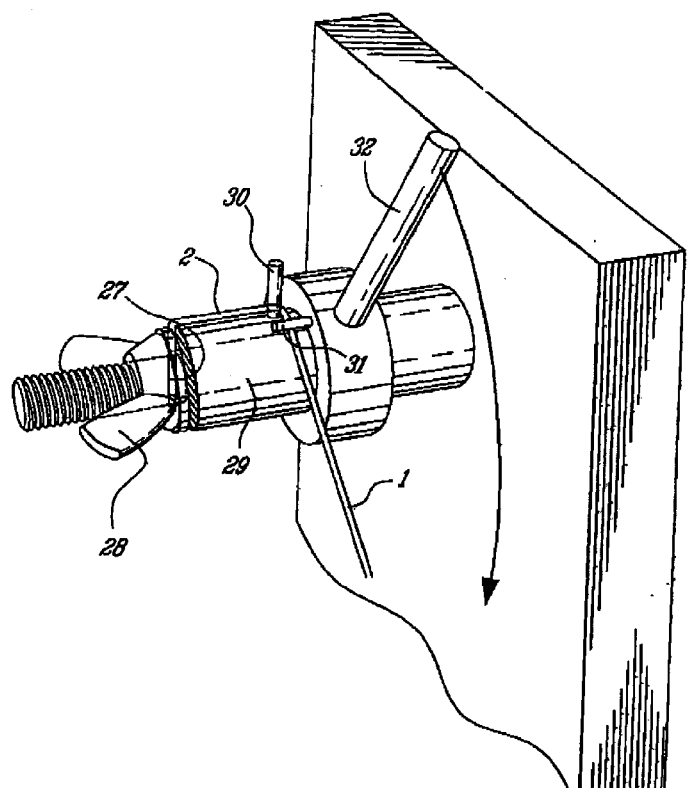
FIG. 13 is a portion of the jig to form the larger portion of the earpiece.

FIG. 13 shows how the larger of the two ellipses is formed. A peg 30 protrudes from the cylinder at a distance from the end of the cylinder equivalent to the location of the first elbow formed by the 90 degree angle. The wire is looped around the peg and a second peg 31 protruding from a rotating handle 32 is placed over the wire. The handle is rotated in a clockwise direction until a specific distance to form the upper curved portion of the earpiece.

Figure 14:
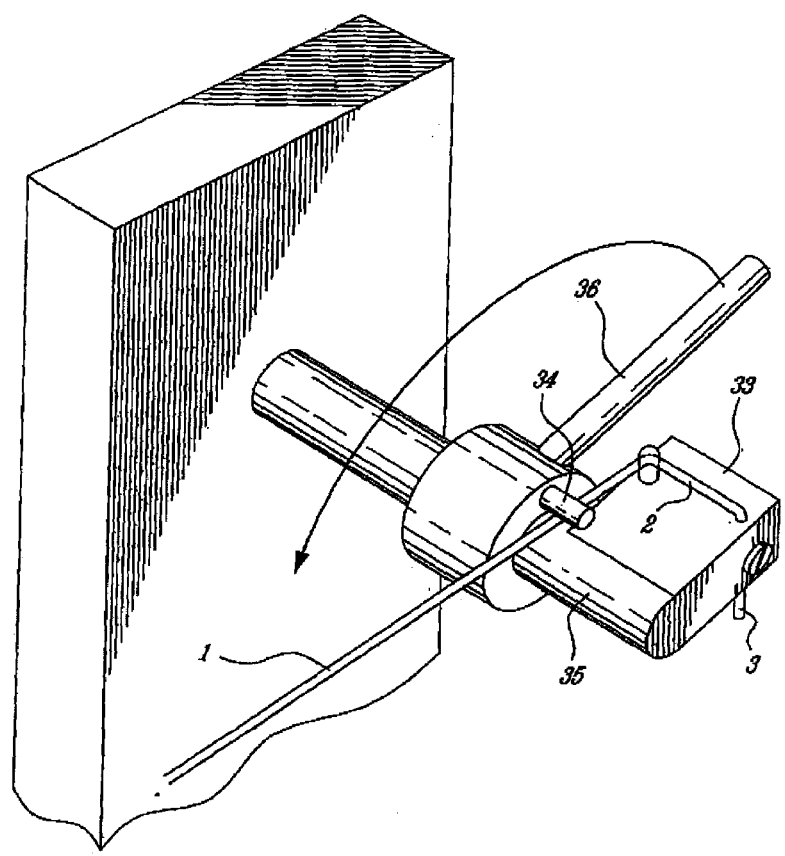
FIG. 14 is the portion of the jig to form the smaller portion of the earpiece.

FIG. 14 shows a similar process to form the lower curved portion of the earpiece. The second end of the wire is clamped 33 down to secure the wire into place. A second rotating handle 36 is used and rotated again in a clockwise direction. The distance of rotation is fixed to obtain a desired size for the curve. Once the wire is released from the clamp 33, it springs back slightly and form the ellipsoid shape.

The mounting for the camera allows the camera to be fixed or detachable from the headset. FIG. 9 shows the small piece on the connector at one end of the headband onto which a small camera can be mounted. In the preferred embodiment, the camera is mounted on the exterior portion of the headset.

Additionally, a microphone and a speaker can also be attached to the headset. Both can be either detachable or fixed. Both can be on either side of the headset, but preferably on the same side as the camera. A small screen such as a Liquid Crystal Display (LCD) can also be attached to the headset to allow the user to view what is being captured by the camera. Furthermore, two cameras can be attached to the headset on the same side, providing the capability of forming a three dimensional image.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A head set comprising
   a headband having a first end at a first extremity of said headband and a second end at a second extremity of said headband;
   a pad-like support means attached to said first end of said head band to rest on a first side of a head;
   a mounting to support a camera; and
   an earpiece attached to said second end of said head band for fitting over an ear, the earpiece pivotable about a horizontal and a vertical axis with respect to said headband, the earpiece comprising
      an ear-shaped, resilient wire; and
      an elastomeric covering pivotable with respect to the wire, wherein said pivoting provides said earpiece with better contact with the head.

2. A head set as claimed in claim 1, wherein said ear-shaped, resilient wire is shaped so as to leave an anterior notch of an ear unobstructed.

3. A head set as claimed in claim 1, wherein said elastomeric covering further comprises a rubber-type tube covering said wire, wherein an inner diameter of said tube is larger than a diameter of said wire, and a non-rigid support with a first surface having a groove to fit over the tube and a second surface being said broader flattened surface.

4. A head set as claimed in claim 3, wherein said non-rigid support is made of thermal plastic rubber.

5. A head set as claimed in claim 1, wherein said mounting is on an outer portion of said second end of said head band.

6. A head set as claimed in claim 1, wherein said mounting allows for a camera to be detachably mounted.

7. A head set as claimed in claim 1, further comprising a speaker.

8. A head set as claimed in claim 7, wherein said speaker is attached at said second end of said headband.

9. A head set as claimed in claim 1, wherein said pad-like support means further comprises two pivotable rounded surfaces having a hard side and a cushion side.

10. A head set as claimed in claim 1, wherein said head band is adjustable in length.

11. A head set as claimed in claim 10, wherein said head band further comprises a moveable rubber-like piece having multiple grooves on an inner surface to fit comfortably on said head.

12. A head set as claimed in claim 1, further comprising a cushion-like padding on said efastomeric covering.

13. A head set as claimed in claim 12, wherein said cushion-like padding has multiple grooves so as to allow an arm of a pair of glasses to elide through.

14. A head set as claimed in claim 12, wherein said cushion-like padding on said elastomeric covering is made of gel-like material.

* * * * *